United States Patent [19]

Diegel

[11] 4,240,867
[45] Dec. 23, 1980

[54] APPARATUS FOR DISPENSING ADHESIVE-BACKED FOIL

[76] Inventor: Herbert F. Diegel, 1524 E. Culver, Phoenix, Ariz. 85006

[21] Appl. No.: 902,298

[22] Filed: May 3, 1978

[51] Int. Cl.³ .............................................. B32B 31/04
[52] U.S. Cl. ..................... 156/543; 156/199; 156/202; 156/216; 156/344; 156/443; 156/446; 156/447; 156/448; 156/555; 156/577; 156/584
[58] Field of Search ............... 156/584, 344, 249, 446, 156/447, 199, 202, 254, 468, 486, 510, 540, 555, 443, 450, 538, 543, 552, 577

[56] References Cited

U.S. PATENT DOCUMENTS

| | | | |
|---|---|---|---|
| 2,325,400 | 7/1943 | Hoover | 156/584 UX |
| 3,111,872 | 11/1963 | Trippler | 156/254 X |
| 3,290,195 | 12/1966 | Davis | 156/468 X |
| 3,509,000 | 4/1970 | Brown | 156/584 |
| 3,598,679 | 8/1971 | Ettre et al. | 156/540 X |
| 3,649,417 | 3/1972 | Izen et al. | 156/446 X |
| 4,115,180 | 9/1978 | Scalia | 156/446 |

*Primary Examiner*—John T. Goolkasian
*Assistant Examiner*—Thomas Bokan
*Attorney, Agent, or Firm*—Cahill, Sutton & Thomas

[57] ABSTRACT

A method and apparatus for dispensing adhesive-backed foil having a protective covering in contact with the adhesive surface. A spool is mounted on a frame to provide a continuous strip of foil to a guide roller having a circumferential groove for receiving and guiding the strip of foil, the groove being approximately the same width as the width of the foil strip. A peel blade incorporates a peel edge contacting the foil between the pressure-sensitive adhesive surface and the protective covering to force the protective covering out of contact with the adhesive surface; the peel blade is mounted to place the peel edge in contact with the foil strip at the guide roller surface. A workpiece, such as a flat decorative glass configuration, is placed with its edge in contact with the adhesive surface of the foil on the guide roller. A workpiece guide is mounted adjacent the guide roller for contacting the workpiece to maintain the edges of the workpiece centered in the circumferential groove of the guide roller. The adhesive-backed foil strip is applied to the edges of the workpiece by forcing the edge of the workpiece against the adhesive backing of the foil on the guide roller while rotating the workpiece.

7 Claims, 11 Drawing Figures

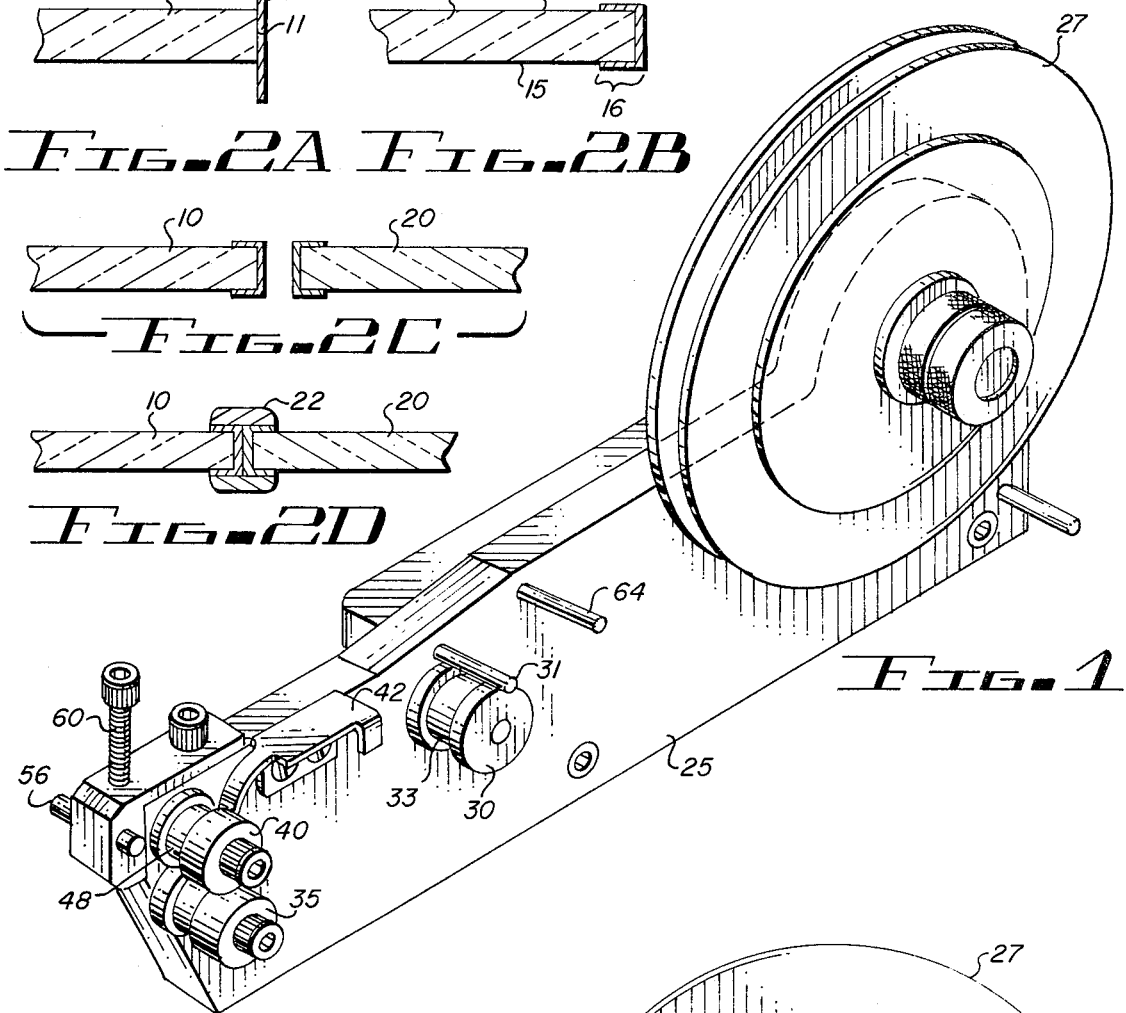
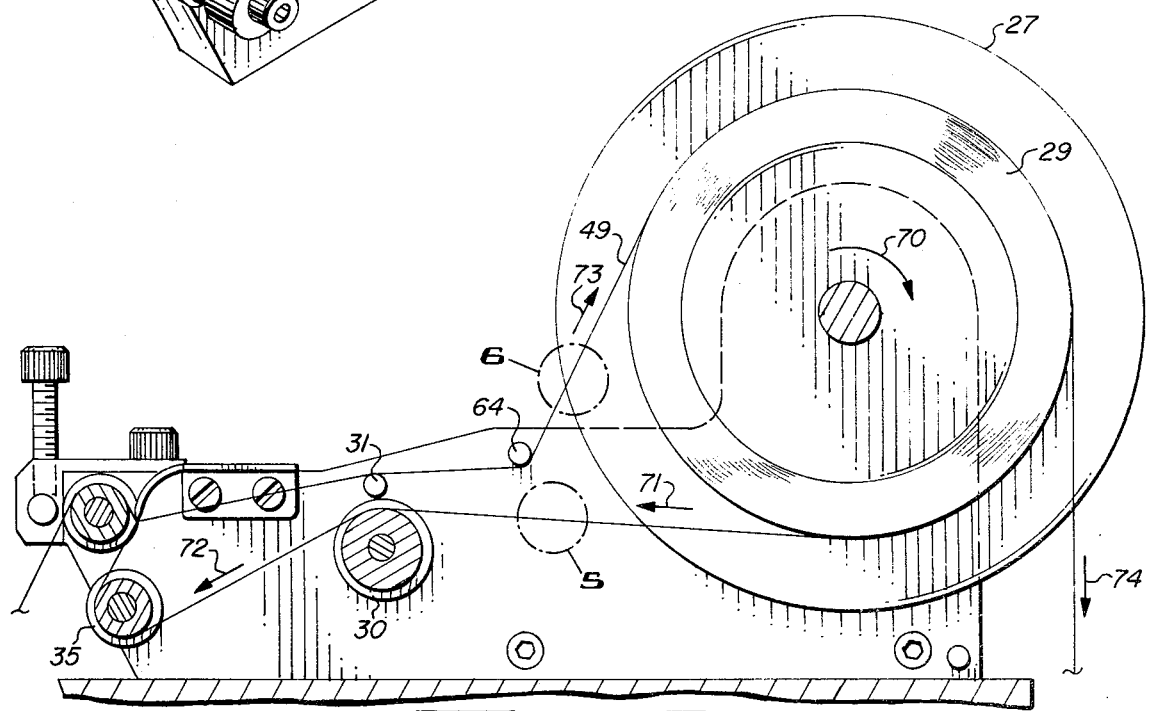

APPARATUS FOR DISPENSING ADHESIVE-BACKED FOIL

The present invention pertains to methods and apparatus for dispensing adhesively-backed foil, and more particularly, for dispensing foil of the type utilized in the construction of stained glass items.

Modern stained glass works are constructed of numerous, sometimes several thousand, small pieces of colored glass or glass-like plastic which are cut to be joined along adjacent edges to form the desired design. Improvements in the technique for joining adjacent glass sections have facilitated the production of stained glass works without detracting from the appearance or aesthetic value of the finished work.

Typically, each individual glass piece is first "edged" with a copper foil and then butted against adjacent glass pieces to be permanently bonded thereto by a ribbon of lead-like solder formed over the adjacent surfaces of the abutting pieces. The copper used for edging the respective individual pieces of glass is originally provided in a continuous strip roll having a pressure-sensitive adhesive on one surface thereof with a protective peel-off covering in contact with the adhesive. The strip is unrolled and the protective covering is peeled back to expose the adhesive surface which is placed in contact with the edge of the piece. The foil is then secured entirely around the piece in contact with all exposed edges. The width of the foil strip is greater than the thickness of the piece or the width of the edge such that the portion of the foil that extends beyond the edge of the piece is folded down onto the flat surfaces of the piece to form a copper "frame" about the piece. A variety of mechanisms have been proposed in the prior art to attempt to permit rapid attachment of the adhesive-backed foil to the edge of the individual pieces. However, such prior art devices have generally been unsuccessful.

When applying the adhesive-backed foil to the edge of a workpiece, it is important that the edge of the piece be centered on the foil so that the portions of the foil that are folded over the workpiece are uniform on both sides of the edge. Removing the protective covering from the adhesive surface of the foil has presented a cumbersome problem to the prior art, and has resulted in apparatus incorporating take-up reels for receiving and winding the protective covering as it is peeled from the foil. Such devices require a means for driving the take-up reel and therefore usually incorporate a belt or other drive means connected to the foil containing spool.

It is therefore an object of the present invention to provide an apparatus for dispensing adhesively-backed foil strip material to the edge of a workpiece for use in a composite stained glass work.

It is another object of the present invention to provide an apparatus for dispensing adhesively-backed foil that provides a means for accurately and continuously centering the edge of a workpiece with respect to the foil.

It is another object of the present invention to provide an apparatus for dispensing adhesively-backed foil wherein the protective covering on the adhesive surface of the foil is readily peeled from the foil and directed out of the work area so as not to interfere with the application of the foil to the workpiece edge.

These and other objects of the present invention will become apparent to those skilled in the art as the description thereof proceeds.

Briefly, in accordance with the embodiment chosen for illustration, a method and apparatus for applying an adhesive-backed foil to the edges of a workpiece incorporate a spool for mounting a continuous roll of foil. A guide roller is provided having a circumferential groove for receiving and guiding the strip of foil as it is removed from the spool; the groove on the guide roller incorporates a width approximately equal to the width of the foil strip. The foil, as it passes over the guide roller, follows the groove therein with the exposed adhesive surface outwardly of the roller to permit the edge of the workpiece to contact the foil and adhere to the edge of the workpiece. A workpiece guide is mounted adjacent the guide roller for contacting the surface of the workpiece to maintain the edge of the workpiece centered in the circumferential groove of the guide roller to thereby insure that the edge of the workpiece is centered on the foil strip and the longitudinal edges of the foil that are to be folded over the workpiece are the same on both sides of the workpiece. A peel blade is mounted adjacent the guide roller and is provided with a peel edge that contacts the foil between the pressure-sensitive adhesive surface and the peel-off protective covering to force the protective covering out of contact with the adhesive surface. The protective covering that is thus removed from the foil is directed back to the foil containing spool. Rather than have a separate take-up reel or other means for withdrawing the protective covering from the work area, reliance is placed on the peel blade to cause the separation between the foil and the protective covering while the frictional engagement of the removed protective covering with the top of the spool containing the foil is sufficient to withdraw the used protective covering from the work area.

The present invention may more readily be described by reference to the accompanying drawings in which:

FIG. 1 is a perspective drawing of apparatus constructed in accordance with the teachings of the present invention.

FIGS. 2A, 2B, 2C and 2D are cross-sectional views of adjacent workpieces showing the manner of adjoining the abutting edges to form a stained glass work.

FIG. 3 is a side elevational view of the apparatus of FIG. 1 showing the direction of travel of the foil and removed protective covering as the foil is being fed from the spool.

Figure 4:
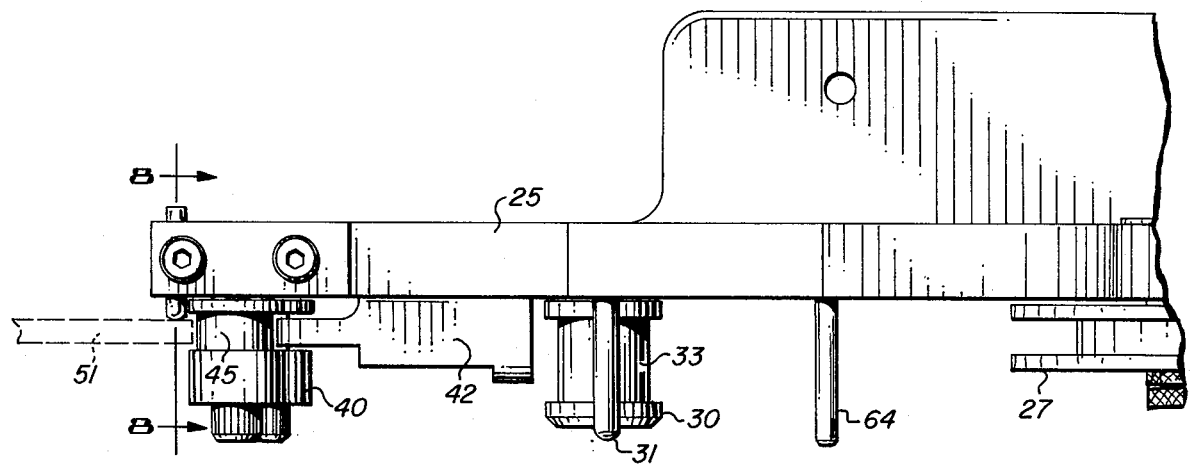
FIG. 4 is a top view of the apparatus of FIG. 1.
Figure 5:
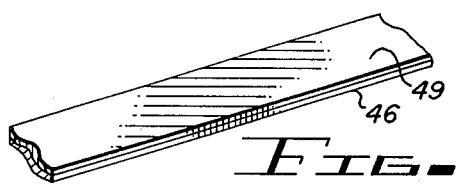
FIGS. 5 and 6 are enlarged perspective views of portions of FIG. 3 shown in broken lines to facilitate the description of the invention.
Figure 6:

Referring now to the drawings, and particularly to FIGS. 2A through 2D, the manner in which adjacent stained glass pieces are joined is shown. As stated previously, stained glass works usually comprise numerous smaller pieces of glass cut to fit in abutting relationship with one another. The individual pieces, or workpieces, are substantially flat although a slight curvature may intentionally be provided for certain types of stained glass art work. As shown in FIGS. 2A through 2D, a stained glass workpiece 10 is framed along its edge 11 through the use of an adhesively-backed foil 12 that contacts and adheres to the edge 11. The foil is usually copper although other types of metals may be used. It may be noted by reference to FIG. 2A that the edge 11 should be centered in the foil 12 so that when the foil is folded back over the upper and lower surfaces 14 and 15, respectively, of the workpiece 10 as shown in FIG. 2B, the edge of the workpiece 10 will be "framed" and the foil will extend along the surfaces 14 and 15 an equal distance 16 as shown in FIG. 2B. When two such workpieces are to be joined in abutting contact, the edged workpieces such as those shown at 10 and 20 in FIGS. 2C and 2D are placed in abutting contact with their respective foil covered edges in contact with one another. With the workpieces held in this manner, a lead solder 22 is formed over the abutting edges and is provided with sufficient width to completely cover the underlying copper foil.

Since the individual workpieces are of a great variety of forms, the foil applied to the respective edges thereof must be applied by hand; further, in view of the manner in which abutting workpieces are joined, it is important that the respective edges of each of the workpieces be properly centered in the adhesive-backed foil placed on each piece.

Figure 7:
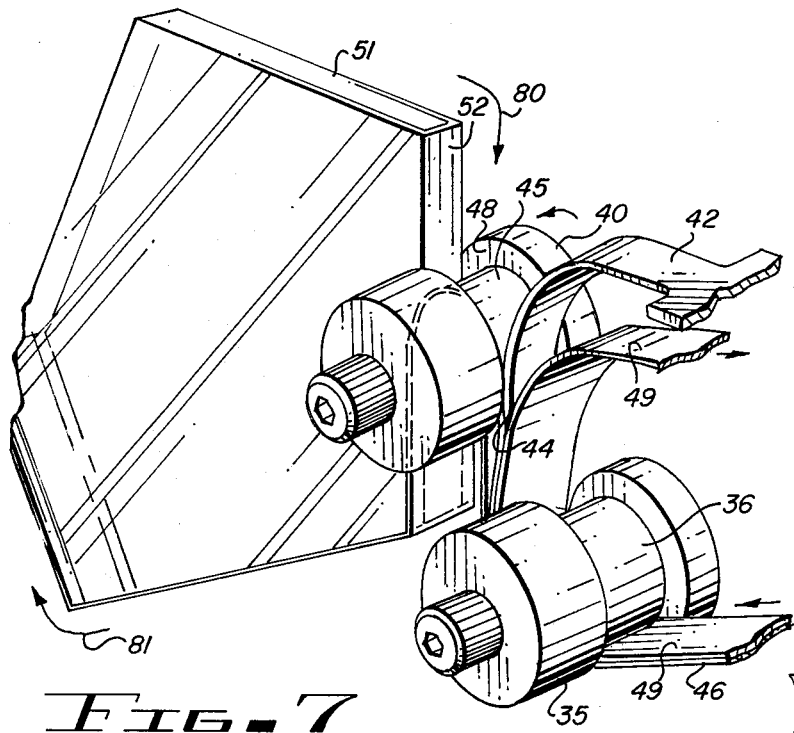
FIG. 7 is an enlarged perspective view of a portion of the apparatus of FIG. 1 useful in illustrating the operation of the peel blade in combination with the guide roller as a workpiece is being edged with the foil.

Referring now to the remaining figures, a frame 25 supports a spool 27 having a roll of adhesive-backed foil thereon as shown at 29. The adhesive-backed foil with a peel-off protective covering is withdrawn from the bottom of the spool 27 and fed between an idler pulley 30 and guide pin 31. The idler pulley 30 includes a circumferential groove 33 so that the foil remains properly aligned with the spool 27 as it is being withdrawn from the bottom thereof. The foil with its protective covering then passes over a directing means or positioning roller 35 which also incorporates a circumferential groove 36 therein to help maintain the proper alignment of the foil. After the foil has passed the positioning roller 35 with the protective covering thereon, it is directed to a guide roller 40 past a peel blade 42. The peel blade incorporates a peel edge 44 positioned adjacent the guide roller 40 and in contact with the foil between the adhesive coating and the protective covering. As shown in FIG. 7, it may be seen that the adhesive surface 45 of the foil 46 passes over the guide roller within the circumferential groove 48 provided therein. The protective covering 49 is peeled from the foil and directed beneath the peel blade away from the work area.

Figure 8:
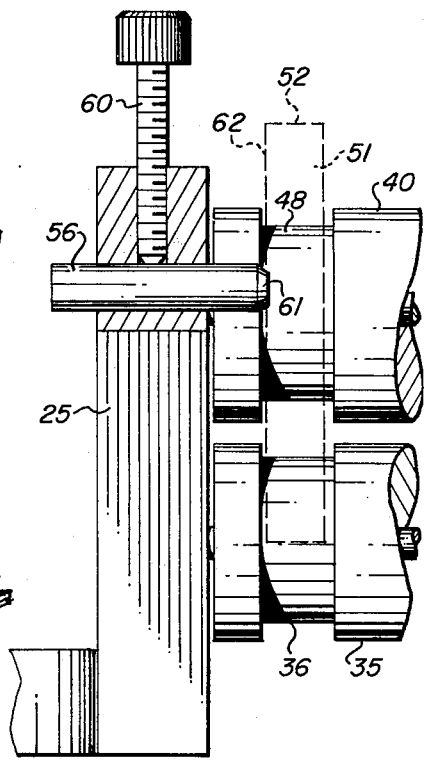
FIG. 8 is an enlarged cross-sectional view of FIG. 4 taken along lines 8—8.

A workpiece, such as the piece of stained glass 51, is held as shown in FIG. 7 with edge 52 in contact with the adhesive surface 45 of the foil 46. To insure that the edge 52 remains centered within groove 48 of the guide roller 40 and therefore centered on the foil 46, a workpiece guide 56 (FIG. 8) is provided. The workpiece guide may take a variety of forms; in the embodiment chosen for illustration, the guide is constructed from a pin extending through the frame 25 an adjustable distance determined by a clamping screw 60. The chamfered end 61 of the workpiece guide contacts the flat surface 62 of the workpiece 51 to insure that the edge 52 of the workpiece remains centered on the foil 46.

The peel blade 42 is secured to the frame 25 as shown in FIG. 4 so as to position the peel edge 44 in close proximity to the circumferential surface of the groove 45 in the guide roller 40. Sufficient space is provided between the peel edge of the peel blade and the surface of the groove 45 to admit the thickness of the foil and adhesive coating but not to admit the additional thickness of the protective covering. As a result, the protective covering is easily peeled from the adhesive coating and directed from beneath the peel blade as shown in FIG. 7 back toward the spool 27 as shown in FIG. 3.

The used protective covering 49 is fed under a guide pin 64, over the top of the spool 27 in contact with the roll of foil 29, and subsequently delivered behind the spool 27 to be discarded. It may be noted by reference to FIG. 3 that as the adhesive-backed foil is withdrawn from the spool 27, the spool rotates as indicated by the arrow 70; the foil with the protective covering is then transported as shown by arrows 71 and 72. When the protective covering and the foil are separated by the action of the peel blade, the foil is provided for application to the edge of a workpiece while the used protective covering is frictionally urged from beneath the peel blade, over the top of the foil roll as indicated by the arrows 73 and 74. The guide pin 64 is positioned to increase the area of contact between the used protective covering 49 and the foil roll 29. In this manner, frictional engagement with the foil roll is sufficient to withdraw the used protective covering from the work area without the utilization of take-up reels or complicated mechanisms. Further, the forces required to peel the protective covering from the adhesive coating of the foil are provided by the operator when the foil is placed on the edge of the workpiece as will be described more fully hereinafter.

When a workpiece is to be edged with adhesive-backed foil, a roll of foil such as that shown at 29 is placed on the spool 27 and the foil is threaded as shown in FIG. 3. The operator then places the workpiece against the workpiece guide as shown in FIG. 3 with the edge 52 of the workpiece in contact with the adhesive coated surface of the foil 46. The workpiece is then rotated generally as indicated in FIG. 7 by the arrows 80 and 81 such that the edge 52 continuously contacts the adhesive coating of the foil 46 and is forced against the adhesive coating to cause the foil to adhere to the edge of the workpiece. As the workpiece is rotated, the foil is withdrawn from the guide roller 40 while the protective covering is continuously peeled from the adhesive coating and directed back to the spool, over the top of the spool in contact with the roll of foil, to exit in an area removed from the work area. When the workpiece has been rotated so that all of the exposed edges thereof have been covered with the adhesive-backed foil, the foil may be cut and the workpiece will be "framed" as shown in FIG. 2A. The edge 52 of the workpiece will continuously be centered on the strip of foil 46 through the combined centering features of the circumferentially grooved guide roll 40 and the workpiece guide 56. The rotation of the workpiece while in contact with the foil on the guide roller 40, will continuously drive the guide roller as well as the roll 29; the rotation of the roll 29 will, in turn, continuously drive the take-up mechanism by frictionally engaging the used protective covering and withdrawing it from the work area.

Workpieces may incorporate relatively straight edges; however, individual stained glass pieces frequently have concave abutting edges. Therefore, the diameter of the guide roller 40 should be chosen to be small enough to insure that contact can continuously be made between the adhesive surface on the foil and the concave edges of the workpiece. Similarly, the thickness of respective stained glass workpieces may vary depending on the type of work in which the piece is to be used. Accordingly, the width of available foil may be chosen to accommodate the width of the workpiece. When a wider or narrower foil is to be used, a guide roller having an appropriate circumferential groove must be chosen. Similarly, the workpiece guide must be adjusted to maintain the edge of the workpiece centered in the circumferential groove of the guide roller and thus centered on the adhesive surface of the foil.

The apparatus of the present invention has been described in terms of a preferred embodiment incorporating a single roll of foil. In many instances, it will be convenient to provide ready access to foil of different widths without having to remove a roll of foil already mounted on the described apparatus. In those instances, it is contemplated that the frame 25 may be used to mount two rolls of different widths on either side thereof such that the adhesively-backed foil with a protective covering will be fed to two guide rollers, one on either side of the frame. In this manner, workpieces of differing thicknesses may be "edged" with foil without the necessity of replacing spools or re-threading the foil.

I claim:

1. Apparatus for dispensing a strip of adhesive backed foil having a foil side and an adhesive side from a roll and applying the foil along and extending laterally from the edges of a substantially flat workpiece free of a peel off adhesive protective covering, the foil being of a width greater than the width of the edges of the workpiece, said apparatus comprising in combination:
   (a) a frame;
   (b) means for rotatably supporting the roll upon said frame;
   (c) a first guide roller rotatably mounted on said frame for guiding the foil, said first guide roller including a circumferential groove of a width commensurate with the width of the foil for contactingly receiving the protective covering side of the foil;
   (d) a second guide roller rotatably mounted on said frame for guiding the foil from said first guide roller to the edges of the workpiece, said second guide roller including a circumferential groove of a width commensurate with the width of the foil for receiving the foil side of the foil and exposing the adhesive side of the foil to the edges of the workpiece, said second guide roller being vertically and horizontally positioned with respect to said first guide roller to define a Z-shaped path for the foil transported from the roll to the edges of the workpiece;
   (e) each of said grooves of said first and second guide rollers having a rectangular cross-section and being of a constant depth to support the full foil width and edge of the workpiece on application of the foil to the edges of the workpiece;
   (f) a peel blade disposed at the point the foil, extending from said first guide roller, contacts said second guide roller, said peel blade being disposed intermediate the foil and the protective covering to urge peeling of the protective covering from the foil and to expose the adhesive side of the foil, which peeling is aided by the reverse curvature of the foil resulting from the supporting contact of the foil with said groove of said second guide roller; and
   (g) pin means for slidingly contacting a lateral surface of the workpiece to guide the edges of the workpiece with respect to said groove of said second guide roller, said pin means including means for adjustably locating said pin means relative to said groove of said second guide roller to accommodate different thickness workpieces and determine the positional relationship between the edges of the workpiece and the foil disposed in said groove of said second guide roller.

2. The apparatus as set forth in claim 1 including directing means mounted on said frame for supporting the foil intermediate the roll and said first guide roller and adding drag to the foil to aid in maintaining the foil taut about said first and second guide rollers.

3. The apparatus as set forth in claim 1 including further means for directing the peeled off protective cover from said peel blade to the roll of foil, which roll, as a result of withdrawal of the foil, rotates to aid in the transport of the protective covering from said peel blade.

4. The apparatus as set forth in claim 1 wherein said pin means includes a pin slidably mounted in said frame and translatable in an axis parallel to the axis of rotation of said second guide roller and a threaded member threadably engaging said frame for locking said pin relative to said frame.

5. The apparatus as set forth in claim 1 wherein said first and second guide rollers vertically overlap one another.

6. The apparatus as set forth in claim 5 wherein said first guide roller is horizontally displaced relative to said second guide roller toward the roll of foil.

7. The apparatus as set forth in claim 1 wherein said peel blade is curved to aid in directing the protective covering away from the adhesive side of the foil.

* * * * *